United States Patent Office 3,454,480
Patented July 8, 1969

3,454,480
IRRADIATION METHOD FOR PRODUCING
AND INCREASING YIELD OF 2,2'-BITHI-
ENYL, 2,3'-BITHIENYL AND 3,3'-BITHI-
ENYL FROM THIOPHENE
Sigmund Berk, Philadelphia, Pa., assignor to the United
States of America as represented by the Secretary of
the Army
No Drawing. Filed May 24, 1965, Ser. No. 458,519
Int. Cl. B01j 1/10
U.S. Cl. 204—158                              9 Claims

ABSTRACT OF THE DISCLOSURE

Proceesses for increasing yield quantities of 2,2'-bithienyl, 2,3'-bithienyl, and 3,3'-bithienyl from liquid thiophene by irradiation thereof by high energy ionizing radiation in the presence of inorganic substrates, most notably aluminum oxide. The process essentially comprises degassing and evacuating a container which holds a thiophene-aluminum oxide mixture and then heat sealing the container prior to irradiation.

The invention described herein may be manufactured and used by or for the Government for governmental purposes without the payment to me of any royalty thereon.

This invention relates to the dimerization of organic compounds and more particularly concerns its effects under the influence of ionizing radiation upon thiophene and the increase of yield of dimers therefrom when additives are employed in the methods involved.

Radiolysis of liquid thiophene has heretofore not been reported in the literature. In my investigations I employ a unit in reporting results called "G" which is a measure of the amount of chemical change which has taken place as a result of the absorption of 100 electron volts of incident energy.

An object of this invention is to change the ratios in which the various isomeric dimers are formed.

Another object of the invention is to increase the relative quantity of isomeric bithienyls produced by irradiation of liquid thiophene.

Still another object of the invention is to increase the extent of chemical change of an organic compound due to the absorption of ionizing radiation.

A further object of the invention is to increase the yield of isomeric bithienyls when thiophene is subjected to irradiation.

The exact nature of this invention as well as other objects and advantages thereof will be readily apparent from consideration of the specification that follows.

For the purposes of this application, penetrating radiation will be understood to include particulate and electromagnetic radiation capable of penetrating and at least partially passing through the materials treated. Neutrons at thermal energies and above, particle beams and X-rays as produced in high energy electrical devices, and radiation from radioactive sources are included in this term.

In describing the irradiation of substances in accordance with my inventive methods, one unit of dose which is employed is the rad. The rad is the amount of energy taken up by a unit quantity of material irradiated. One rad is equal to 100 ergs of energy taken up by 1 gram of material irradiated.

As a result of my irradiation of thiophene at relatively high doses of the order of 500,000 rads or more, certain radiolysis products are formed. For example, hydrogen, methane and other radiolysis products are formed as a result of the irradiation of thiophene and these products are formed in certain well-defined ratios to each other and to the quantity of organic compound irradiated. In addition, my isomeric bithienyls are also formed in low yields.

The irradiation of thiophene will exemplify my process. Thiophene is a 5-membered heterocyclic compound containing a single sulfur atom. Upon irradiation, it is expected that the following reaction will occur:

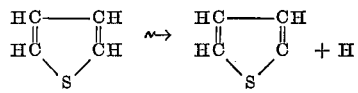

and that two or more thienyl radicals will combine or couple to form isomers:

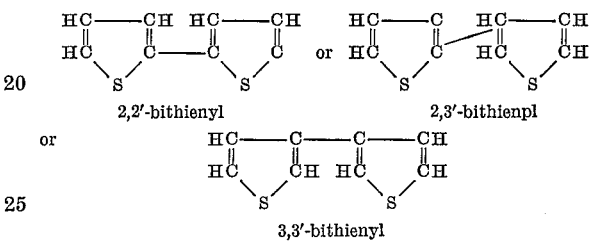

Similarly, the above isomers are capable of coupling among themselves or with another bithienyl producing higher isomers as terthienyls, quaterthienyls, etc.

One of the principal advantages achieved through the practice of my invention is a transfer of energy from the surface of a solid substance, such for example, as aluminum oxide, to an organic compound, thereon, such, for example, as liquid thiophene. While the mechanism of this phenomenon is not clearly understood, it is thought to be responsible for the modification of ratios in which products of radiolysis are formed as compared with the ratios in which they are formed as a result of bulk irradiation of the same organic compounds in the absence of my additives.

Thus it has been demonstrated that very significant increases in the percentage of isomeric bithienyls in the radiolysis products can be attained by irradiation of thiophene in the presence of certain inorganic substrates. The extent of the modification of percentages in which the various radiation induced isomeric bithienyls are forméd in contact with a number of solids is demonstrated in Table I hereinafter presented and discussed.

In general, the solid substance on which the organic material is deposited should be insoluble in both the organic substance and the solvents which may be used with them, and it should be unreactive with both. Generally, finely divided or high surface area unreactive solid substances such as inorganic substances of mineral origin are satisfactory suspending media. For example, oxides of mineral origin have been found to be very effective in inducing the formation of isomeric bithienyls in the radiolysis of thiophene.

The extent of radiolysis, i.e., the total amount of products of radiolysis formed, is significantly changed over that produced in the absence of my additives. Also, a change in the distribution of the products occurs, i.e., the relative concentrations of the isomeric bithienyls are different when irradiation occurs in the presence of my additives. Doses of radiation in excess of 100,000 rads are useful in practicing the methods of my invention.

The following examples are illustrative of the methods of the present invention although it will be understood that the scope of the methods do not limit them to these examples.

EXAMPLE I 4 ml. of thiophene were added to a 15 ml. glass ampoule and 5.1 g. of alumina, 80–200 mesh (A–2) having the following chemical composition:

| | Percent |
|---|---|
| $Al_2O_3$ | 92.00 |
| $Na_2O$ | 0.90 |
| $SiO_2$ | 0.09 |
| Other oxide traces | 0.01 | added thereinto. The A–2 alumina has the following physical properties:

| | |
|---|---|
| Loss on ignition (1100° C.) _____percent | 6.2 |
| Specific gravity | 3.3 |
| pH | 9.0 |

Sieve analysis:
  2% maximum retained on an 80 mesh screen.
  5% maximum passing through a 270 mesh screen.

The contents of the ampoule were degassed by alternate freezing and thawing with liquid nitrogen and evacuating to a pressure of 0.001 mm. of mercury. This degassing procedure was repeated four successive times. The ampoule was then heat sealed under vacuum and irradiated with gamma irradiation in a Cobalt-60 Irradiator. The dose rate was $1.9 \times 10^5$ rads per hour. After irradiation for 100 hours, the ampoule was broken and the liquid contained therewithin collected and analyzed by gas liquid chromatography. For purposes of comparison, thiophene alone was simultaneously irradiated under the identical conditions above described.

EXAMPLE II 15 ml. glass ampoules separately containing 5 g. each of the aforementioned A–2 alumina and D–2 alumina, which is a basic aluminum oxide having a pH of 10 and containing less than 0.2% extractable salts and no water and two similar ampoules containing 5 ml. thiophene were each degassed separately by alternate freezing and thawing with liquid nitrogen and evacuating to a pressure of 0.001 mm. of mercury which constituted one degassing operation. These degassing operations were repeated at least three times. The contents of one degassed thiophene ampoule were then transferred to the ampoules containing the A–2 alumina while the other degassed thiophene was transferred to the ampoule containing the D–2 alumina. The ampoules now containing the mixture of thiophene and alumina were heat sealed under vacuum and irradiated with gamma irradiation in a Cobalt-60 Irradiator for 306 hours at a dose rate of 1.7 rads per hour. The liquid portions of the ampoule contents were chromatographed using Carbowax 20 M at 230° C. Carbowax 20 M is a non-volatile, solid polyethylene glycol compound, soluble in both water and aromatic hydrocarbons and has a molecular weight of 20,000. The chromatograph employed a 6′, ¼″ O.D. stainless steel column and was packed with about 15% by weight of the Carbowax 20 M on a solid support of glass beads, although tetrafluoroethylene, firebrick or flux-calcined diatomite supports, all between about 60–100 mesh were found to work satisfactorily.

Table I reveals the improved yields of the isomeric bithienyls when the alumina powders aforementioned were employed.

Alumina has a high electron density and the dose rate was corrected therefore. Of course, my indicated yields would be even further improved if this electron density were ignored and the G value based solely on the thiophene present. The G value is a measure of the amount of chemical change taking place as a result of the absorbtion of 100 electron volts of incident energy. My process envisages such preferred forms of high energy ionizing radiation as alpha particles, beta rays, X-rays, neutrons, etc. Cobalt-60 is a suitable source of radiation and has a half-life of 5.3 years and emits gamma radiation of 1.33 and 1.17 million electron volts. Another example of a suitable and convenient source of gamma radiation for carrying out my invention is tantalum-182, having a half-life of 117 days, and gammas of 1.22, 1.13, 0.22 and 0.15 mev. Cesium-137 is another good source which can be used. Numerous other gamma irradiating isotopes available from chain reacting piles and cyclotrons can also be used. Other materials providing gamma radiation are available as naturally occurring materials, e.g., potassium-40, bismuth-214, protactinium-234, thallium-208 and lead-211. Choice of a particular source of gamma radiation will depend upon availability, expense, intensity and the convenience of handling. Sources having an intensity from below about 100 curies up to, for example, 100 kilo curies can be conveniently handled with proper facilities.

Another possible method for increasing yields of my isomeric bithienyls may be accomplished by passing gaseous or liquid thiophene over a bed of one of my above mentioned alumina powders and washing reaction products off the bed with fresh thiophene. Dimers could be collected and the solvent thiophene recirculated to the irradiator. Separation of the dimers could then readily be performed with column or gas liquid chromatography. My methods should also find use in producing isomeric dimers of hydrocarbons, aromatics, heterocyclic compounds, etc. Mixed dimers may also be produced, such, for example, irradiated thiophene with benzene additions may yield a number of phenylthiophene isomers.

TABLE I.—YIELD OF ISOMERIC BITHIENYLS WHEN THIOPHENE IS IRRADIATED ALONE AND WITH ADDITIVES

| Composition | Hours of irradiation | Yield G bithienyls | | |
|---|---|---|---|---|
| | | 2,2′ | 2,3′ | 3,3′ |
| Thiophene (alone) | 100 | .030 | .030 | .011 |
| Thiophene+A–2 ($Al_2O_3$) | 100 | .037 | .049 | .027 |
| Percent, change in yield | | +23 | +63 | +245 |
| Thiophene (alone) | 306 | .014 | .014 | .007 |
| Thiophene+A–2 ($Al_2O_3$) | 306 | .013 | .016 | .206 |
| Percent, change in yield | | −8 | +11 | +371 |
| Thiophene+D–2 (basic $Al_2O_3$) | 306 | .059 | .105 | .029 |
| Percent, change in yield | | +750 | +750 | +414 |

In the above table, all dosages employed were $1.0 \times 10^5$ rads per hour and the irradiation was gamma type from a Cobalt–60 Irradiator. The alumina designation A–2 and D–2 were of the types and amounts aforedescribed.

It is apparent from the foregoing description that I have provided simple, efficient and economical methods for increasing yields of desirable isomeric dimers.

I claim:
1. A process for dimerizing thiophene comprising the step of irradiating said compound with high energy ionizing irradiation.
2. A process of dimerizing thiophene as described in claim 1 wherein said thiophene is irradiated with high energy ionizing irradiation in the presence of an aluminum oxide.
3. The process of claim 3 wherein said aluminum oxide is a type selected from the group consisting of A–2 and D–2, said A–2 aluminum oxide consisting of 92 weight percent $Al_2O_3$, 0.90 weight percent $Na_2O$, 0.09 weight percent $SiO_2$ and 0.01 weight percent of other oxide traces, a loss on ignition at 1100° C. of 6.2%, specific gravity of 3.3, pH of 9.0 and a sieve analysis of 2% maximum retained on an 80 mesh screen and 5% maximum passing through a 270 mesh screen, said D–2 aluminum oxide being a basic $Al_2O_3$ having a pH of 10 and containing less than 0.2% extractable salts and being devoid of water.

4. A radiation isomerization process which comprises the steps of adding a mixture of thiophene and alumina to a container, degassing said container,
evacuating said degassed container,
heat sealing said evacuated container,
irradiating said heat sealed container with high energy ionizing radiation, and
forming isomeric bithienyls from said thiophene.

5. A process for forming improved isomer yields of 2,2'-bithienyl, 2,3'-bithienyl and 3,3'-bithienyl from thiophene comprising
adding about 4 to 5 ml. of thiophene into a glass ampoule,
pouring about 5 g. of alumina selected from the group consisting of A–2 and D–2 to form a mixture, said A–2 aluminum oxide consisting of 92 weight percent $Al_2O_3$, 0.90 weight percent $Na_2O$, 0.09 weight percent $SiO_2$ and 0.01 weight percent of other oxide traces, a loss on ignition at 1100° C. of 6.2%, specific gravity of 3.3, pH of 9.0 and a sieve analysis of 2% maximum retained on an 80 mesh screen and 5% maximum passing through a 270 mesh screen, said D–2 aluminum oxide being a basic $Al_2O_3$ having a pH of 10 and containing less than 0.2% extractable salts and being devoid of water,
degassing said mixture by alternate freezing and thawing thereof with liquid nitrogen,
evacuating the resultant mixture to a pressure of about 0.01 mm. mercury,
insuring the complete degassing of said mixture by repetition of the degassing steps,
heat sealing said degassed ampoules under vacuum,
irradiating said degassed ampoules with high energy ionizing radiation utilizing a dose rate of about 1.0 to $1.9 \times 10^5$ rads per hour for about 100 to 306 hours and,
collecting said isomeric bithienyl.

6. The process of claim 5 further characterized by said irradiation having an intensity from about 100 curies to 100 kilocuries.

7. A process for forming improved isomer yields of 2,2'-bithienyl, 2,3'-bitheneyl and 3,3'-bithienyl from thiophene comprising the steps of
adding about 5 grams each of A–2 and D–2 aluminum oxide respectively to separate ampoules,
said A–2 aluminum oxide consisting of 92 weight percent $Al_2O_3$, 0.90 weight percent $Na_2O$, 0.09 weight percent $Na_2O$, 0.09 weight percent $SiO_2$ and 0.01 weight percent of other oxide traces, a loss on ignition at 1100° C. of 8.2%, specific gravity of 3.5, pH of 9.0 and a sieve analysis of 2% maximum retained on an 80 mesh screen and 5% maximum passing through a 270 mesh screen, said D–2 aluminum oxide being a basic $Al_2O_3$ having a pH of 10 and containing less than 0.2% extractable salts and being devoid of water,
pouring about 5 ml. each of thiophene into other ampoules,
separately degassing each of the said ampoules,
repeating said degassing steps,
transferring one of said degassed ampoules containing thiophene to said degassed ampoule containing A–2 alumina to form a first mixture,
transferring another of said degassed ampoules containing thiophene to said degassed ampoule containing D–2 alumina to form a second mixture,
heat sealing the ampoules containing each of said first and second mixtures,
irradiating with high energy ionizing radiation said heat sealed ampoules for about 300 hours at a dose rate of about 1.7 rads per hour to form said isomeric bithienyls.

8. The process of claim 5 further characterized by said radiation being alpha particles, beta rays, gamma rays, X-rays or neutrons.

9. The process of claim 8 further characterized by said gamma rays being derived from tantalum-182, cesium-137, potassium-40, bismuth-214, protactinium-234, thallium-208 or lead-211.

References Cited

UNITED STATES PATENTS 3,258,404   6/1966   Hentz _____ 204—162 X

OTHER REFERENCES

Chemical Abstracts, 62 (March 1965) p. 4811 f.
Chemical Abstracts, 61 (August 1964) 5808 c.

HOWARD S. WILLIAMS, *Primary Examiner.*